(No Model.)
C. E. SCRIBNER.
APPARATUS FOR PARTY TELEPHONE LINES.
No. 593,245. Patented Nov. 9, 1897.
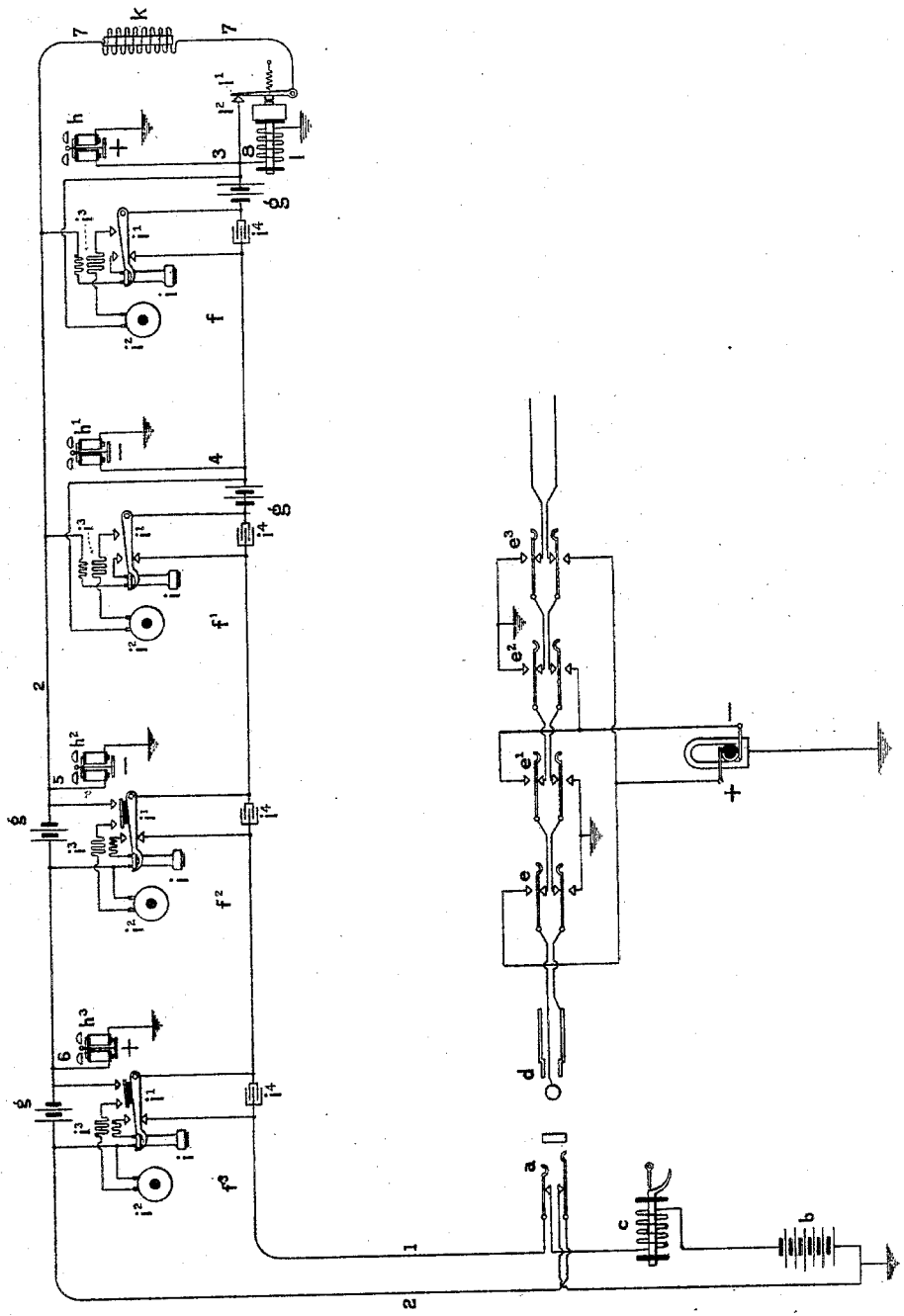
Witnesses:
D. H. C. Tanner
John W. Sinclair
Inventor:
Charles E. Scribner,
by Barton + Brown his Att'ys

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

APPARATUS FOR PARTY TELEPHONE-LINES.

SPECIFICATION forming part of Letters Patent No. 593,245, dated November 9, 1897.

Application filed March 16, 1897. Serial No. 627,800. (No model.)

*To all whom it may concern:*

Be it known that I, CHARLES E. SCRIBNER, a citizen of the United States, residing at Chicago, in the county of Cook and State of Illinois, have invented a certain new and useful Improvement in Apparatus for Party Telephone-Lines, (Case No. 440,) of which the following is a full, clear, concise, and exact description, reference being had to the accompanying drawing, forming a part of this specification.

This invention is an appliance designed for association with certain special equipments for party lines comprising transmitting-batteries and selective signaling apparatus and is intended to avoid interference in operation between the different parts of the system.

It has become common to provide telephone-stations with local storage batteries for operating the transmitting-telephones, the storage batteries being connected with the line and charged during the idleness of the line by current from a centrally-located source common to many lines. When these local storage batteries are applied to stations on a party line, the storage batteries are connected serially in the line, and the line-circuit is provided with a permanently-closed return beyond the last station. This closed return-circuit must include an impedance-coil to prevent interference with telephonic transmission in the circuit, the telephones at the different stations being brought into bridges of the line-circuit during their use. This serial connection of the local storage batteries, in combination with the permanently-closed return-circuit and the impedance-coil therein, forms the subject of my prior application, (Case No. 390,) Serial No. 557,826, filed August 1, 1895. It is usual also to provide metallic-circuit party lines serving no more than four stations with selective signals comprising two oppositely-polarized bells located at different stations in branches to earth or to a suitable return-circuit, the bell at any particular station being rung by applying current of proper direction to one of the line conductors, as shown in Patent No. 555,725, dated March 3, 1896, to A. S. Hibbard. In attempting to combine these appliances in a single party line it is found that the permanently-closed circuit for the charging-current permits the polarized signaling-current to reach either line conductor from the other, and thus to operate the bells at two stations simultaneously.

The present invention consists in an electromagnetic or other switch or appliance for breaking the closed path provided for the charging-current during the transmission of signaling-current, this switch being controlled from the central office preferably through any suitable agency in the act of signaling.

A particular organization for party lines may be arranged as follows: The two lines of the metallic circuit are led at the central office from which the line emanates to the poles of a source of charging-current, and means are provided there for breaking the line connection with the source of current and applying the signaling-current to either line conductor. In each line conductor two local storage batteries are included serially, one at each of two stations, and from the same conductor two oppositely-polarized bells are connected in ground branches. After traversing the battery at the last station the line conductors are united through an impedance-coil of low resistance. In the conductor uniting them the switch-contacts of an electromagnetic switch or relay are interposed, the magnet of the relay being located in a ground branch from one of the line conductors and the relay being provided with a suitable device for rendering it irresponsive to signaling-currents in the line.

This form of the invention is illustrated in the accompanying drawing.

The line conductors 1 and 2 extend to the line-contacts of a spring-jack $a$ in a telephone-switchboard, from which they are prolonged to the poles of a battery $b$ or other source of charging-current. A line-signal $c$ is interposed in conductor 1 and is located in the switchboard near the spring-jack. This signal is designed to display its indicator when its magnet is rendered inert by breaking the charging-current flowing in the line. The usual plug $d$ is furnished in the switchboard for making connection with the spring-jack $a$. Interposed in the plug-circuit is a group of calling-keys $e$, $e'$, $e^2$, and $e^3$, each of which is designed to connect current of a particular polarity to one only of the line conductors, the other pole of the source of signaling-current being then grounded.

The line conductors extend to four stations $f$, $f'$, $f^2$, and $f^3$. Local storage batteries $g$, located at stations $f$ and $f'$, are interposed in line conductor 1. Similar batteries at stations $f^2$ and $f^3$ are placed in conductor 2. At stations $f$ and $f'$ ground branches 3 and 4 are provided from the line conductor 1. One of these branches includes the station signal-bell $h$, which is polarized to respond to intermittent current of positive direction. The bell $h'$ at the station $f'$ is of similar construction and arrangement, but is adapted to respond to negatively-directed current. In similar ground branches 5 and 6 from line conductor 2 at stations $f^2$ and $f^3$, respectively, the bells $h^2$ and $h^3$ of those stations are placed, these also being polarized to respond to intermittent currents of opposite direction.

The usual telephones $i$ are provided at the different stations with switches $i'$, which are constructed to bring the station-telephones into bridges of the metallic-line circuit when the telephones are removed from their switches for use. The switches control other local circuit connections which bring the local storage batteries of the stations into circuit with the usual transmitting-telephones $i^2$ and induction-coils $i^3$ during the use of the telephones. A condenser $i^4$ is interposed in line conductor 1 at each station. The switch $i'$ at the station is, however, arranged to short-circuit this condenser normally, bringing it into the circuit only during the use of the station-telephone for the purpose of interrupting the current at such time to operate the signal $c$.

After traversing the last station $f$ of the series the line conductors 1 and 2 are united by a wire 7, which should include an impedance-coil $k$. This coil may be of comparatively low resistance—say forty ohms—but should be characterized by high impedance. The continuity of wire 7 is controlled by the switch-contacts of a relay $l$. The magnet of this relay is located in a ground branch 8 from line-wire 1. The magnet of the relay should be of high resistance, one thousand ohms being a suitable amount. The pole of the relay which is presented to the armature is surrounded by a heavy ring of copper or other good conductor, which serves to prevent the attraction of the armature when the magnet is traversed by a rapidly-pulsating current in a way well known in the art. During the normal condition of these appliances current flows from battery $b$ through line conductors 1 and 2, the switch-contacts $l'$ and $l^2$ in wire 7 being maintained in contact by a shunted portion of the current flowing to earth through magnet $l$. Hence the circuit of the charging-current is normally completed through the impedance-coil $k$, and the storage batteries at the different stations are subjected to a continual charging-current. When in response to a call from another line the operator at the central office desires to ring the bell at any station, she inserts plug $d$ into the spring-jack $a$ and depresses the proper calling-key of the group. It will be observed that the depression of one of the keys—key $e$, for example—will connect a current of positive direction from the generator to line conductor 1. The key $e'$, being depressed, will connect the negative pole of the same generator with the same line conductor. Keys $e^2$ and $e^3$ are adapted to connect the negative and positive poles, respectively, of the generator with line conductor 2. Hence the depression of any key $e$, $e'$, $e^2$, or $e^3$ will operate the bell at station $f$, $f'$, $f^2$, or $f^3$, respectively.

The insertion of plug $d$ into spring-jack $a$ causes the interruption of the extensions of the line conductors to the terminals of the source of current $b$. Hence that act deprives the relay $l$ of current and permits its switch-contacts to break the circuit through wire 7. Then when the signaling-current is applied to one of the line conductors no shunted portion of it can reach the other line conductor to operate the relay in connection therewith. If the ringing-current be sent in line conductor 1, the shunted portion of it which traverses wire 8, including the magnet of relay $l$, will be ineffective to operate the relay on account of the copper tube surrounding the core. Of course any other of several well-known devices might be employed to prevent the operation of the relay by a pulsating current, while permitting its excitement by a steady current.

The subscriber called, responding to the signal, removes his telephone from its switch, whereby the bridge of the line-circuit including his telephone is closed and the local circuit of the transmitting-telephone including the local storage battery is completed.

It will be apparent that the specific mode of associating the relay $l$ with the party-line circuit is not essential in this invention, inasmuch as the relay might be differently constructed or arranged or located in a different portion of the circuit and controlled by other means at the central office and still serve the same purpose. The invention is also not limited in its application to party lines.

The novel features of the invention are defined in the following claims:

1. The combination with a normally complete metallic-line circuit, of appliances included serially in the circuit at different stations, means in the line-circuit for exciting the said instruments through the agency of current in the complete circuit, other appliances connected with each of the line conductors, a relay at one extremity of the circuit adapted to sever the connection between the line conductors there, means at the other terminal of the circuit for applying current to either line conductor to determine the operation of the said appliance connected therewith, and means controlled from the same terminal for exciting the said relay to break the connection between the line conductors; whereby the appliances in the line conductors may be excited by current in the complete circuit, or either line conductor may be isolated from the other to permit the operation of the appliance connected therewith, substantially as described.

2. The combination with a line-circuit of two normally-united conductors, appliances serially in the said circuit and means for producing current in the line for exciting said appliances, a return-circuit, and a signal connected between the return-circuit and each of said line conductors, a relay adapted to sever the connection between the said line conductors, means for applying current to either of said line conductors and the return-circuit to operate one of the signals, and means for controlling the said relay to sever the connection between the line conductors at the same time, as described.

3. The combination with two line conductors and a return-circuit extending to different stations, a local storage battery in each of said line conductors, a conductor uniting said line conductors at one end, and a source of charging-current included therein, a conductor uniting said line conductors at their distant terminals, and a relay controlling the continuity of said last-mentioned conductor, a signal-bell connected between each of said line conductors and the return-circuit, a battery-circuit normally closed through the said relay to maintain the continuity of the line-circuit, a switch adapted to break the relay-controlling circuit, and means for breaking the line-circuit through said source of current and applying to either line conductor current for operating the corresponding bell, as described.

4. The combination with a closed telephone-circuit extending from a central office to different substations, of a source of charging-current in the line-circuit at the central station, and a local storage battery in the line-circuit at each substation, a return-conductor, a signal-bell in a branch from each line conductor to said return-conductor, an electromagnetic switch and circuit connections of the magnet thereof with the line-circuit adapted to permit the excitement of the magnet by the charging-current or a shunted portion thereof, the switch-contacts of said electromagnetic switch being interposed in the line-circuit beyond the last station, means at the central station for making connection with the line, and for applying calling-current to either of said line conductors and the return-conductor to operate a bell, and a switch adapted to break the circuit through said source of charging-current to control the electromagnetic switch, substantially as described.

5. The combination with two line conductors and a return-conductor extending from a central station to different substations, of a grounded source of current connected with one of the line conductors at the central station, and a ground connection to the other of said line conductors, local storage batteries serially in the line conductors at the different stations, signal-bells in ground branches from the line conductors at the different stations, a relay in a ground branch from that line conductor with which the charging-battery is connected beyond the last station, said relay being constructed to respond to continuous current only, a conductor uniting the line conductors beyond the last station, said conductor being controlled by the switch-contacts of the relay, a spring-jack for the line and a plug therefor, said spring-jack being adapted to break the connection of the line conductors with the ground branch and the battery at the central office, and keys associated with the plug, each adapted to connect a source of calling-current with one of the line conductors and the return-circuit to operate a corresponding bell, substantially as described.

In witness whereof I hereunto subscribe my name this 25th day of January, A. D. 1897.

CHARLES E. SCRIBNER.

Witnesses:
ELLA EDLER,
MYRTA F. GREEN.